(12) United States Patent
Alkhani et al.

(10) Patent No.: US 11,346,826 B2
(45) Date of Patent: May 31, 2022

(54) SYSTEM AND APPARATUS FOR TESTING AND/OR EVALUATING AN INDUSTRIAL CATALYST

(71) Applicant: Saudi Arabian Oil Company, Dhahran (SA)

(72) Inventors: Anas Farkad Alkhani, Dhahran (SA); Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 150 days.

(21) Appl. No.: 16/587,878

(22) Filed: Sep. 30, 2019

(65) Prior Publication Data

US 2021/0096113 A1   Apr. 1, 2021

(51) Int. Cl.
*G01N 31/10* (2006.01)

(52) U.S. Cl.
CPC .................................. *G01N 31/10* (2013.01)

(58) Field of Classification Search
CPC ........................................................ G01N 31/10
USPC ............................................................. 436/37
See application file for complete search history.

(56) References Cited

U.S. PATENT DOCUMENTS

| | | | |
|---|---|---|---|
| 3,431,077 A * | 3/1969 | Danforth | G01N 30/12 422/80 |
| 4,099,923 A * | 7/1978 | Milberger | B01J 19/0093 422/211 |
| 6,149,882 A * | 11/2000 | Guan | B01J 19/0046 422/131 |
| 6,497,844 B1 | 12/2002 | Bacaud et al. | |
| 6,548,305 B1 * | 4/2003 | Deves | G01N 31/10 422/130 |
| 6,551,832 B1 * | 4/2003 | Deves | G01N 31/10 422/504 |
| 6,869,800 B2 | 3/2005 | Torgerson et al. | |
| 7,063,982 B1 | 6/2006 | Karlsson et al. | |
| 8,361,798 B2 | 1/2013 | Ducreux et al. | |
| 8,502,004 B2 | 8/2013 | Butler et al. | |
| 9,943,819 B2 | 4/2018 | Sidhu | |
| 2002/0059842 A1 | 5/2002 | Torgerson et al. | |
| 2002/0170976 A1 * | 11/2002 | Bergh | B01J 19/0046 236/49.1 |
| 2003/0040116 A1 * | 2/2003 | Canos | B01L 3/502 436/37 |

(Continued)

FOREIGN PATENT DOCUMENTS

| | | |
|---|---|---|
| CA | 2263212 C | 3/2006 |
| CN | 106370770 A | 2/2017 |

(Continued)

OTHER PUBLICATIONS

Petrov, "Problems and Challenges About Accelerated Testing of the Catalytic Activity of Catalysts," Institute of Catalysis, Bulgarian Academy of Science.

(Continued)

*Primary Examiner* — Arlen Soderquist
(74) *Attorney, Agent, or Firm* — Leason Ellis LLP

(57) ABSTRACT

The invention relates to an integrated process for assessing one or more properties of a catalyst. In the method, a standard chemical reactor or reactors is/are provided, and a bypass means is also provided, to transport a sample of whatever is added to the industrial reactor, to the test reactor. Both gases and liquids are transferred to the test reactor.

21 Claims, 4 Drawing Sheets

(56) References Cited

U.S. PATENT DOCUMENTS

| | | | |
|---|---|---|---|
| 2004/0132194 A1* | 7/2004 | Bricker | B01J 19/0046 436/37 |
| 2006/0148089 A1 | 7/2006 | Arvindan et al. | |
| 2007/0071664 A1* | 3/2007 | Bellos | G01N 31/10 422/211 |
| 2008/0003139 A1* | 1/2008 | Bricker | G01N 31/10 422/68.1 |
| 2008/0014127 A1 | 1/2008 | Ogawa et al. | |
| 2010/0174129 A1* | 7/2010 | Bauman | B01J 38/50 585/501 |
| 2010/0317907 A1* | 12/2010 | Bauman | C10G 49/26 585/310 |
| 2010/0320121 A1* | 12/2010 | Bauman | B01J 19/0046 208/57 |
| 2010/0323449 A1* | 12/2010 | Bauman | B01J 19/0093 436/34 |
| 2010/0324157 A1* | 12/2010 | Bauman | B01J 19/0046 518/706 |
| 2011/0045596 A1* | 2/2011 | Ducreux | B01J 8/008 436/37 |
| 2014/0171707 A1* | 6/2014 | Nyce | C07C 2/84 585/329 |
| 2017/0173551 A1* | 6/2017 | Dumeignil | C07C 41/09 |
| 2018/0008947 A1* | 1/2018 | Choi | B01J 19/2445 |
| 2018/0010058 A1* | 1/2018 | Kirchmann | B01J 19/0013 |

FOREIGN PATENT DOCUMENTS

| | | | |
|---|---|---|---|
| DE | 2714939 | * | 10/1978 |
| DE | 102008032097 | * | 1/2010 |
| FR | 2777805 | A1 | 4/1998 |
| WO | 9807026 | | 2/1998 |
| WO | 02/04112 | * | 1/2002 |
| WO | 2004/073861 | * | 9/2004 |
| WO | 2006083437 | A2 | 8/2006 |
| WO | 2007104290 | A1 | 9/2007 |

OTHER PUBLICATIONS

International Search Report and Written Opinion in corresponding International Patent Application No. PCT/US2020/052417 dated Jan. 29, 2021. 11 pages.

No Author. "Improvements in ammonia synthesis catalyst." Nitrogen. vol. 193, Sep. 1, 1991, pp. 17 , 19-22, 24-25, 27-28 and 30-31.

* cited by examiner

SYSTEM AND APPARATUS FOR TESTING AND/OR EVALUATING AN INDUSTRIAL CATALYST

FIELD OF THE INVENTION

The invention relates to an apparatus for useful in testing properties of a catalyst, as well as processes for using this apparatus for testing a catalyst.

BACKGROUND AND PRIOR ART

Process conversion plants used in industries such as oil, gas, chemical, and petrochemicals rely on catalysts as essential components of processes designed to yield the maximum amount of a desired product or products while simultaneously optimizing the energy requirements necessary to achieve these aims.

"Catalysts" as used in these fields, generally comprise a catalytically active metal, such as one or more of Co, Mo, Ni, and W (these are exemplary and not limitative), and a support material, which may be but is not necessarily, one of a crystalline zeolite, such as an amorphous alumina, titania, or silica. (It is to be understood that by "active metal," this application means one or more than one, combined, and this is also the case for the components of the support). In brief, a well designed catalyst drives the kinetics of a desired reaction in the desired direction.

The artisan knows that industrial catalysts are available in different states and compositions, across essentially all industries.

The design of catalysts is challenging, and when one is interested in a specific reaction or specific reactions, multiple options are presented. Every user has its own selection criteria for the catalyst(s) used. These include, e.g., the nature of the feedstock, the objective, the desired yield, and so forth.

The factors that are at issue with respect to selection of a catalyst generally require the user to test multiple options before proceeding with the catalyst selected. These testing procedures are expensive and require a great deal of time.

Turning to catalysts and their use in the petrochemical industry, the catalyst in question are generally evaluated in pilot plants, over a period of from 2 months to 1 year. Some of the properties which are evaluated are activity, selectivity, and stability. Testing stability of a catalyst requires a longer period of time than the other properties being evaluated and, given limited resources, "bottlenecks" the ability to evaluate further catalysts.

The methods available for overcoming this bottleneck are not satisfactory. For example, building additional pilot plants is very expensive.

An alternative to building more facilities involves placing a small receptacle (generally referred to as a "basket"), inside a commercial reactor, together with a small amount of the catalyst being tested. The catalyst then acts with whatever feedstock is being treated, in a chosen reaction cycle at chosen conditions. This approach means that one cannot assess the catalyst until after the cycle is completed. Further, assessing the stability by, e.g., determining the remaining activity of the catalyst requires the use of the aforementioned pilot plant.

When all factors are considered, it is not at all unusual for the testing period for a particular catalyst to run for 2-3 years.

The foregoing details the current state of the art with respect to catalyst testing. In short, feedstock is sampled at an operating facility, shipped to a testing facility, and undergoes several months of testing. Alternatively, "basket utilization" requires 2-3 years of testing. Both approaches are lengthy, and expensive.

U.S. Pat. No. 8,361,798 to Ducreux, et al., which is incorporated by reference, teaches a methodology, referred to as "grafting" in the disclosure, because a catalyst testing device is "grafted" onto an industrial installation. The disclosure features a two phase system in which the feedstock must be liquid and the catalyst must be solid. The configuration of the test system does not allow for testing of gas phase components, i.e., hydrogen containing gas components. The ability to test a catalyst with a gaseous feedstock is critical, especially in systems which use "flash drum" technologies. Notwithstanding the teachings of the '798 patent, the art lacks a methodology for testing catalysts with all of (i) liquid only feedstocks, (ii) gas only feedstocks, and (iii) mixed feedstocks of both liquids and gases.

Additional prior art relates to the invention includes U.S. Pat. No. 9,943,819 to Sedhu, et al., which utilizes basket type technology of the type discussed supra, but does not integrate a test system with an industrial reactor system.

U.S. Pat. No. 8,502,004 to Butler, et al., describes the type of system discussed supra, involving pilot plants. Such systems, as will be understood by the skilled artisan, can only approximate actual working conditions. Additional prior art documents which may be of interest include U.S. Pat. No. 6,869,800 to Torgenson, et al.; U.S. Pat. No. 6,497,844 and its French counterpart FR 2777805 to Bacaud, et al.; published U.S. Patent Application No. U.S. 2008/0014127 to Ogawa, et al.; published U.S. Patent Application No. U.S. 2006/0148089 and its International Application counterpart, WO 2006/083437, International Application WO 2007/104290; WO 1998/07026, and its Canadian counterpart CA 2 263 212 and Petrov, "Problems and Challenges about Accelerated Testing of the Catalytic Activity of Catalysts" in *Principles & Methods for Accelerated Catalyst Design and Testing*. All of the references cited herein are incorporated by reference.

None of these documents teach or suggest the invention, which is elaborated upon in the disclosure which follows.

SUMMARY OF THE INVENTION

The invention is an apparatus and method for assessing catalysts. The invention affords the artisan the opportunity to test the catalyst under completely real time conditions. A test unit which can assess a catalyst in operation on a mixture of hydrocarbon feedstock and a gas, e.g., hydrogen, which can be pure hydrogen, or mixes of hydrogen and other gases, depending upon the testing protocol under consideration, is installed adjacent to a commercial reactor system, and receives a sample of the mixture of hydrocarbon feedstock and gas, e.g., hydrogen, which is identical to one used in the commercial reactor, under the identical conditions of the reaction. While the invention might be viewed as a "mini pilot plant," this is not completely accurate, as a pilot plant can approximate, but cannot duplicate, the conditions of a commercial reactor system. The invention permits vast reductions in the amount of time necessary to assess a catalyst resulting in, e.g., vast reductions in the cost of this aspect of the petroleum refining industry.

In one embodiment of the invention, means are provided, e.g., by providing depressurizing and isolating means, which allow the user to replace one or more of the catalysts in any of the test reactors, as frequently as is necessary or desirable.

BRIEF DESCRIPTION OF THE FIGURES

FIG. 5a1 shows an embodiment of the invention using a single catalyst.

FIG. 5a2 shows an embodiment of the invention using two catalysts.

DETAILED DESCRIPTION OF PREFERRED EMBODIMENTS

Figure 1:
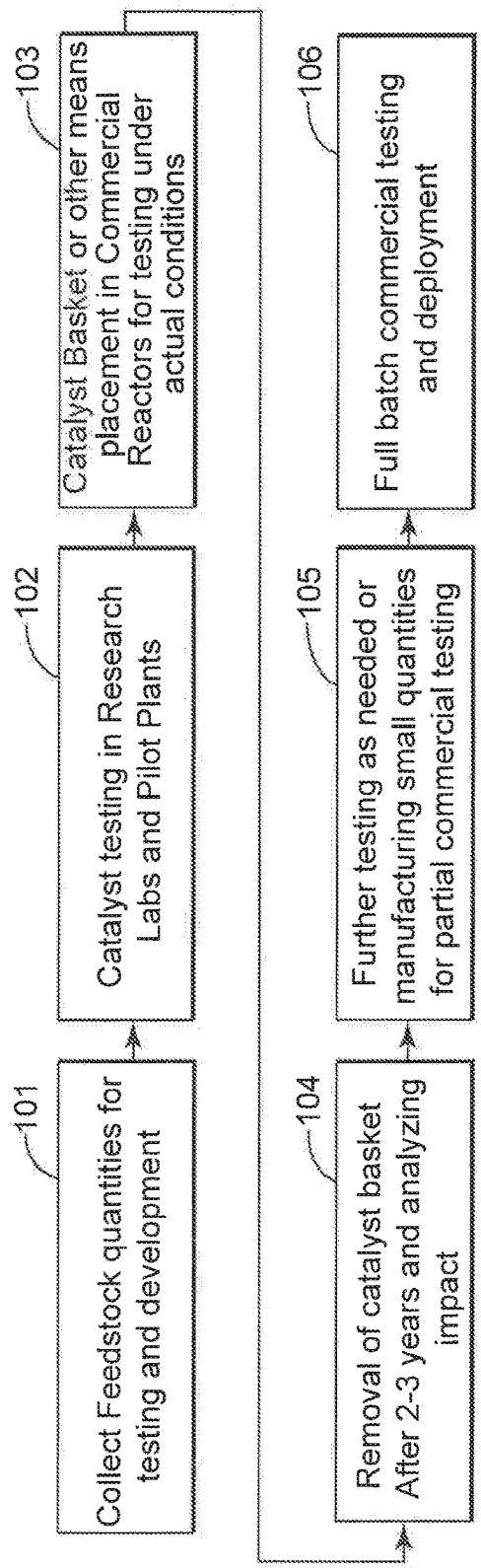
FIG. 1, labeled as "Prior Art," presents a flow chart of a standard catalyst testing process.

Referring to the drawings, FIG. 1 in particular, one can use the standard, prior art process for evaluating a catalyst of interest. Sample of feedstock are collected "101", and then tested in a research lab and/or pilot plant "102", as described supra. Any catalysts which show promise are then returned for "basket placement" or "basket testing" "103", in commercial reactors, also as described supra. As noted, again supra, this can take as long as 2-3 years "104", and may be followed by further testing "105" and "106".

Figure 2:
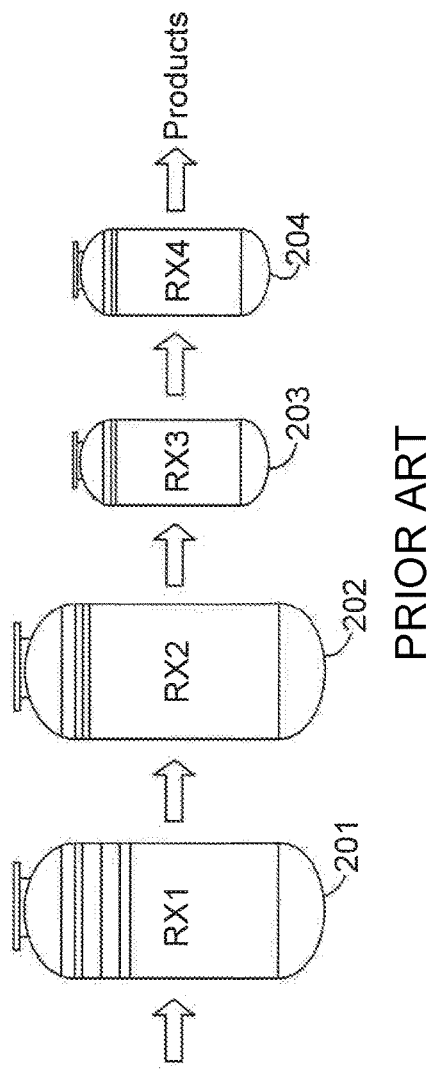
FIG. 2, also labeled "Prior Art," shows the standard way two phase test systems are used.

An alternative prior art process, also discussed supra, is shown in FIG. 2.

FIG. 2 shows the type of system described in, e.g., U.S. Pat. No. 8,361,798, cited supra. This is a two phase system. A commercial reactor "201" is connected to a test reactor "202" via a liquid transport means, which is not shown. Only liquid moves to test reactor "202", which contains the catalyst of interest. Products of the test reactor "202" move to further chambers "203" and "204" for evaluation.

Figure 3:
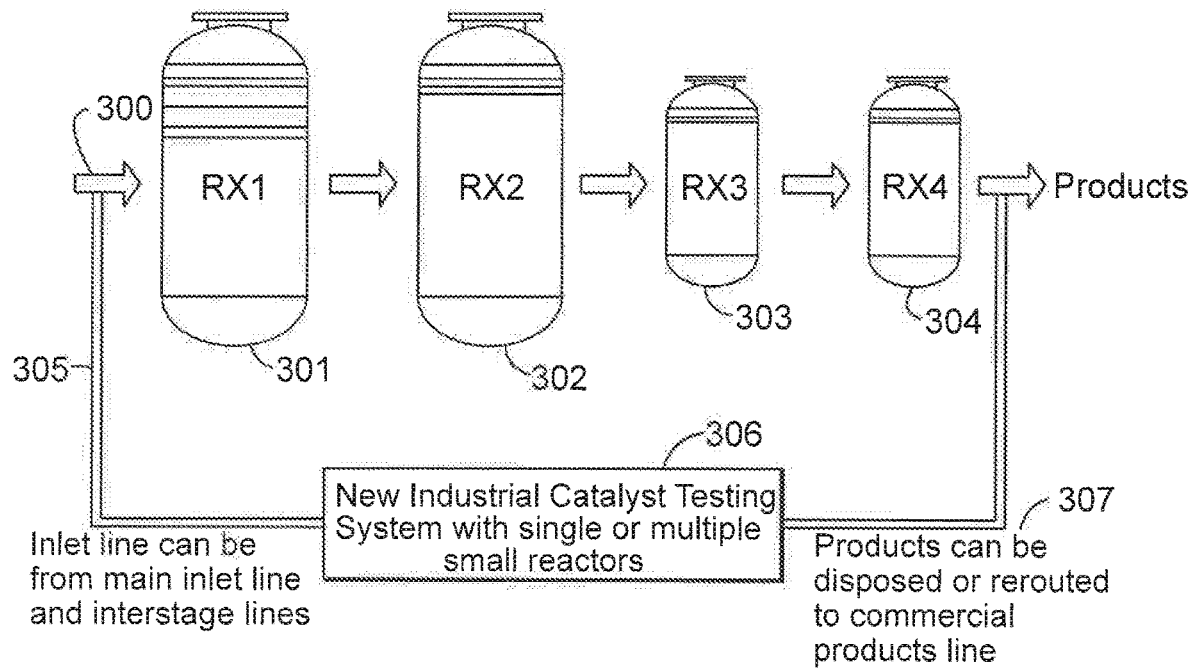
FIG. 3 depicts a broad aspect of the invention.

FIG. 3 shows a broad embodiment of the invention. Feedstock is delivered to a commercial reactor "301," via a feedstock delivery means "300." This hydrocarbon feedstock has preferably been mixed with a gas such as hydrogen before delivery, but in an alternative, "301" can include a second delivery means for adding a gas such as hydrogen to contact the hydrocarbon feedstock prior to contact with the catalyst. One or preferably both delivery means are a part of the reactor. The gas, e.g., hydrogen, can also be dissolved in a liquid.

While the feedstock proceeds through additional reactors "302," "303," and "304," an inlet means "305" permits "bleeding" of a mixture of hydrocarbon feedstock and gas portion of the feedstock to a test reactor system "306." The inlet means "305" can be placed at any point along the sequence of reactors "301"-"304," subject to requirements discussed infra. Hence, the test feedstock will have been subjected to any of the conditions which the feedstock has been subject to in the commercial reactor sequence. Following reaction in the test reactor system "306," the products are analyzed "307," to determine the efficacy of the catalyst of interest.

Figure 4:
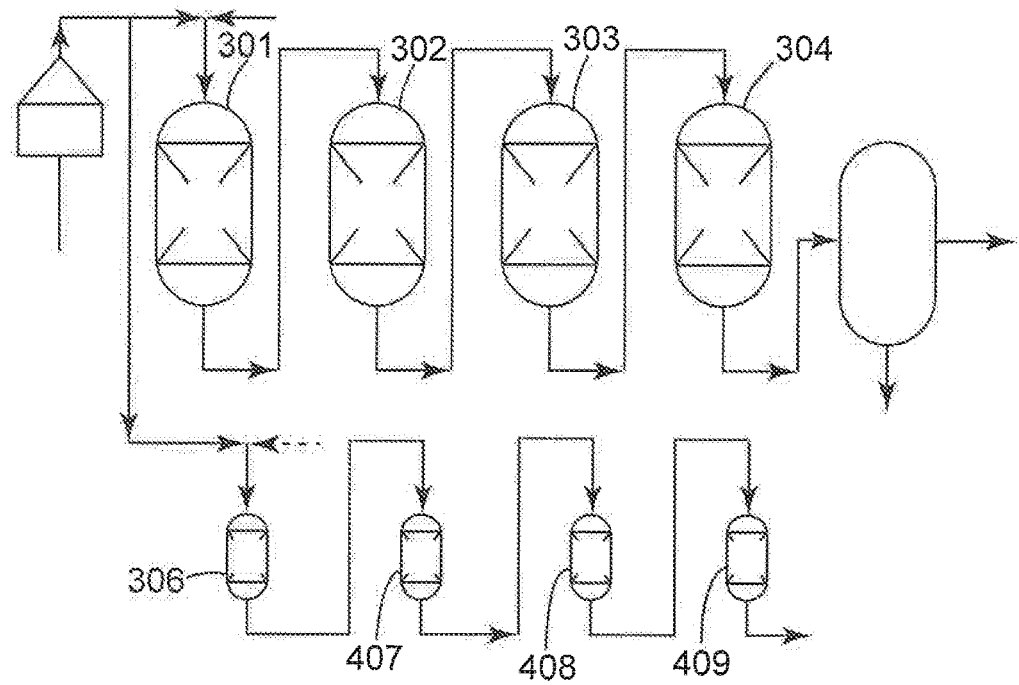
FIG. 4 presents the embodiment of FIG. 3 in greater detail.

This embodiment can be seen in greater detail in FIG. 4, where the commercial reactor system "301"-"304" is shown again, with various means for moving reaction product from one reactor to another.

Inlet means "305" is also shown, leading to test reactor "306." As can be seen, test reactor "306" is followed by additional test reactors "407"-"409," and "410" in other figures, so as to mirror the commercial reactor system. It will also be seen that each reactor, be it a commercial or test reactor, is connected to one or more additional reactors via inlet means.

Figure 5:
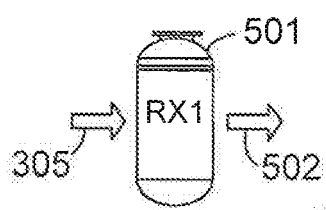
FIG. 5 shows operation of the invention when testing more than one catalyst using three variants of the invention.
Figure 5:
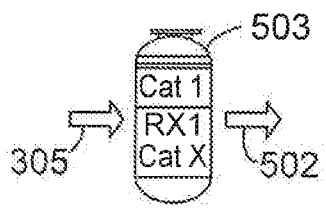

FIG. 5 shows, schematically, three different variations on the test reactor system.

FIG. 5a1 shows the test reactor at its simplest, where the inlet means "305" referred to supra, leads to a reactor containing a single catalyst. This type of system is used when there is only one catalyst in the first commercial reactor. The reactor "501" is equipped with an outlet means "502."

A variant of this single reactor system is shown in FIG. 5a2, where reactor "503" contains two catalysts ("Cat1" and "RX1 Cat-X"), positioned, such that the feedstock from the chemical reactor contacts both catalysts.

Figure 5B:
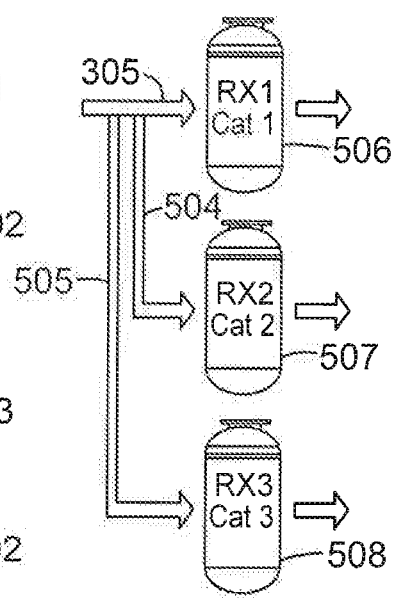
FIG. 5b shows an embodiment of the invention with a trifurcated inlet.

FIG. 5b shows an embodiment where inlet means "305" trifurcates, with new inlet means "504" and "505." The three inlet means "305," "504," and "505," each lead to a separate test reactor ("506," "507," and "508"), each of which contains a single, different catalyst. Such a system permits evaluation of several catalysts under identical conditions.

Figure 5C:
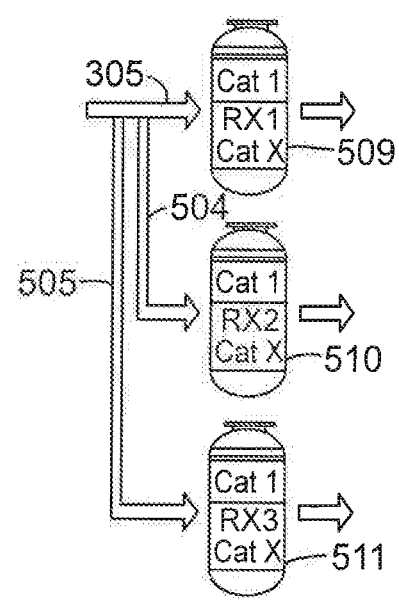
FIG. 5c shows an embodiment using a trifurcated inlet and 3 reactors, each of which uses two catalysts.

FIG. 5c also shows the trifurcated feedstock inlet means "305," "504," and "505," with three test reactors "509," "510," and "511." each of which is equipped with 2 catalysts, as in FIG. 5a2.

It should be noted that the number of reactors and catalysts being evaluated may vary, and is a matter left to the skilled artisan to choose.

The reactor lengths, both chemical and test, can be from 0.5 to 50 meters long, and are preferably from 1 to 5, and preferably 1-3 meters long. A further preferred embodiment has reactors with an ID (internal diameter) ranging from 1 cm to 25 cm, and preferably 1-10 cm.

The reactors optionally contain quench space, which permits effluents to cool. In other embodiments, the reactor system provides means for recycling gas, such as hydrogen gas, to these quench spaces.

Similarly, in any and all embodiments of the invention, the nature of the catalyst(s) in the test reactors is "open." In other words, while the catalyst(s) used in the test reactor may be identical to the catalysts of the commercial reactor, they may be similar, or completely different. Essentially, the nature of the catalyst(s) used in the test reactor is completely open to the artisan's choice. Any of the catalysts described herein may also comprise an inert diluents, such as glass beads or silicon carbide. The skilled artisan also knows that different catalyst configuration are known and used, such as, but not being limited to, fixed bed, ebullated bed, or slurry bed configurations. Further, the catalysts may be deployed in single or multiple layers.

In this embodiment, the "trifurcated" feed system allows for delivery of the different types of feedstock to be tested.

The furcating, e.g., allows for testing each of (i) liquid feedstock, (ii) gaseous feedstock, and (iii) mixtures of the two.

The artisan will recognize that the concepts discussed herein, such as separating liquid and solid feedstocks, require instrumentation and conditions, which are well known. This disclosure does not repeat features that are well known to the skilled artisan.

Figure 6:
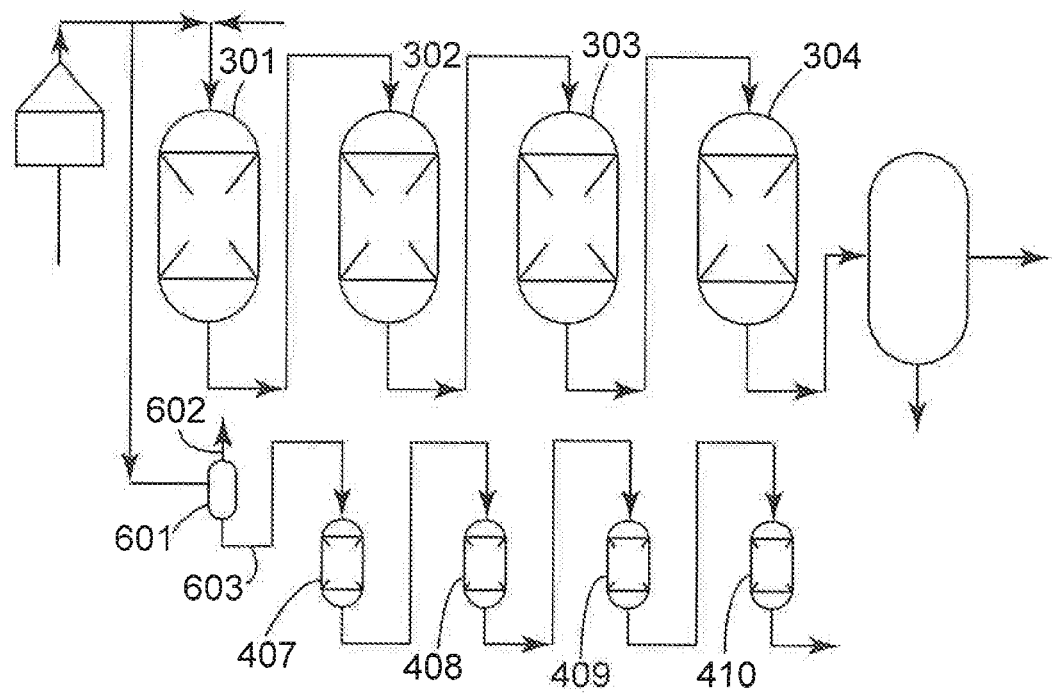
FIG. 6 shows the invention when using a lash drum as part of the industrial reactor.

FIG. 6 shows an especially preferred embodiment of the invention which employs a flash drum in order to separate liquid and gas phases into different streams. The figure is identical to FIG. 4 except for the inclusion of flash drum "601." Flash drums are well known to the art and permit separation of liquids and gases. The gases leave through outlet means "602," while the liquids move through outlet means "603." In the embodiment shown, the liquid portion moves to the test reactors, and gas is allowed to escape; however, the gas may be directed to the test reactors with liquid being removed, or the two phases may be channeled, separately via different test reactor pathways.

Figure 7:
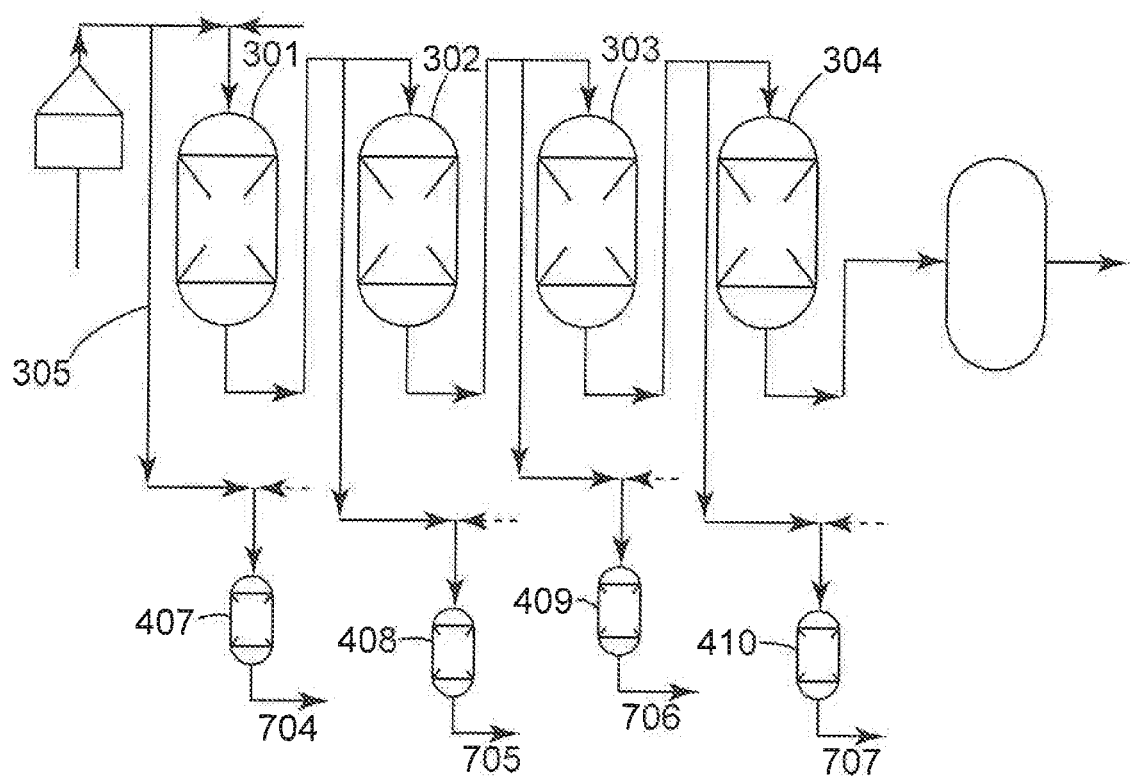
FIG. 7 shows an embodiment of the invention in which the test apparatus receives feedstock from more than one source.

A further embodiment of the invention is shown in FIG. 7. In this embodiment, the placement and nature of the reactors is essentially the same as, e.g., FIG. 4.

This embodiment differs from the others in that, rather than having a single inlet means for delivering feedstock to the test reactors, the system is configured so that mean are provided to deliver products from the different reactors, to different test reactors. This can be seen via reference numbers "701," "702," and "703." It should be noted as well that the system may be configured so that products from test reactors can be channeled to other test reactors. Note feed lines "704," "705," "706," and "707."

Figure 8:
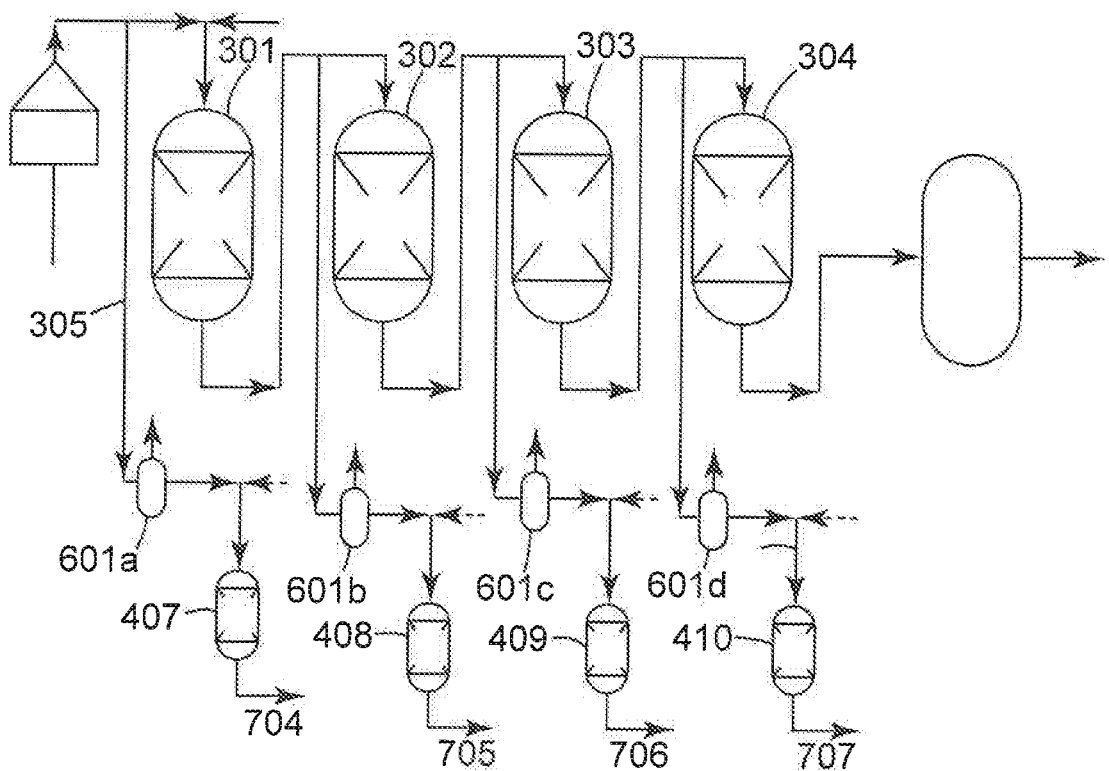
FIG. 8 depicts an embodiment which essentially combines aspects of the invention as shown in FIGS. 6 and 7.

FIG. 8 is also a variation of the embodiment of FIG. 4, and also combines aspects of FIGS. 6 and 7. Note that each individual test reactor is equipped with its own flash drum "601a"-"601d". Also, the individual flash drums receive feed which is the product of the commercial reactors.

The invention as described can be used to test one or more properties of a catalyst in a particular reaction system or systems. In its broadest terms, one or more test reactors are connected to a commercial or chemical reactor, such that the test reactor or reactors (sometimes referred to as the test reactor "system"), contain the same catalysts and are operated under the same conditions, such that an "in situ" evaluation can be carried out quickly and accurately. As described supra, via providing bypass means for channeling portions of liquid and gaseous materials from a commercial chemical reactor, the evaluation takes place simultaneously with the commercial operation of the reactor.

Optionally, the test reactor system also has input means for adding materials, such as hydrogen or other gases to the system, so as to more closely parallel the reaction in the commercial reactor.

In preferred embodiments, the test system comprises a flash or separator vessel, such that liquid and gaseous phases can be separated and the effect of a test catalyst in these phases can be evaluated separately.

As noted via, e.g., the figures, more than one test reactor can be used in the system, in the same way multiple reactors may be used in a commercial system.

Also as pointed out, supra, one or more of the test system reactors can comprise multiple reactor beds, so that more than one catalyst can be tested concurrently.

The conditions which are used in the commercial and test reaction systems are identical. Exemplary, but not limitative of the conditions, are an operating pressure of 250 bars or less, a reaction temperature of from 100-450° C., and LHSV of 0.1-20 $h^{-1}$, and so forth.

Additional potential embodiments include adding grading material to the test reactor, and the catalyst beds can be diluted with, e.g., inert material, so as to enhance catalyst wetting and axial dispersions.

It is well known that, in the petrochemical industries, various types of reactors, such as fixed bed, ebullated bed, continuous stirred bed reactors, slurry bed reactors, moving bed reactors, and combinations of these.

With reference again to the petrochemical arts, the reactors (both commercial and test) can be insulated to minimize heat loss, and the test reactors can be operated either through the commercial reactor cycle, at intervals, or at any time interval desired by the operator.

In operation, it is well known that feedstock to a commercial reactors can include recycled materials. Further, additives can be included in the feedstock of the test reactors, so as to simulate products such as, but not being limited to, hydrogen sulfide and ammonia. Continuing with features of the feedstock, this can be added to the reactors as up-flow or down-flow.

It will also be understood that the test reactors can be adapted to simulate standard conditions of a commercial reactor, such as start-up, shut-down, catalyst activation, catalyst regeneration, and so forth.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

We claim:

1. A process for assessing at least one property of a catalyst, comprising:
   introducing a mixture of hydrocarbon feedstock and a gas to a chemical reactor which contains a catalyst, said chemical reactor having a bypass means for a portion of said mixture;
   said bypass means being connected to a test reactor which contains a catalyst;
   separating said mixture of hydrocarbon feedstock and the gas into a gas phase and a liquid phase in a separation chamber arranged upstream of said test reactor;
   circulating at least one of the gas phase or the liquid phase in said test reactor to react said at least one of the gas phase and the liquid phase with said catalyst to produce an effluent, and
   testing said effluent to determine a property of said catalyst in said mixture.

2. The process of claim 1, wherein said catalyst contained in the test reactor is identical to the catalyst in the chemical reactor.

3. The process of claim 1, wherein said catalyst contained in the test reactor is different from the catalyst in the chemical reactor.

4. The process of claim 1, wherein said catalyst contained in the test reactor comprises an inert diluents.

5. The process of claim 4, wherein said inert diluents comprises glass beads or silicon carbide.

6. The process of claim 1, wherein said catalyst in the test reactor is in the form of a whole bed.

7. The process of claim 1, wherein said catalyst in the test reactor is positioned in a plurality of layers.

8. The process of claim 1, wherein said chemical reactor comprises a second delivery means for delivering a gas to said mixture prior to said mixture contacting said catalyst.

9. The process of claim 8, wherein said gas in said mixture and said gas delivered by said second delivery means are both hydrogen.

10. The process of claim 1, further comprising a separation chamber downstream of said test reactor.

11. The process of claim 1, wherein said chemical reactor comprises multiple catalyst beds, each of said multiple catalyst beds containing a different catalyst.

12. The process of claim 11, wherein said test reactor comprises multiple catalyst beds, each of said multiple catalyst beds containing a different catalyst, the number of catalyst beds in said test reactor being equal to number of catalyst beds in said test reactor.

13. The process of claim 11, comprising a plurality of test reactors, each of which contains a catalyst also contained in said chemical reactor, said test reactors positioned so that said mixture contacts each catalyst in order equal to contact in said chemical reactor.

14. The process of claim 1, wherein said gas is dissolved in a liquid.

15. The process of claim 1, wherein said chemical reactor and test reactor are fixed bed, ebullated bed, or slurry bed reactors.

16. The process of claim 1, wherein said chemical reactor and said test reactor are 0.5 m-50 m long.

17. The process of claim 16, wherein said chemical reactor and said test reactor are 1 m to 5 m long.

18. The process of claim 1, wherein said chemical reactor and said test reactor have an ID of from 1 cm to 25 cm.

19. The process of claim 1, wherein said chemical reactor and said test reactor comprise quench space.

20. The process of claim 19, wherein said chemical reactor and said test reactor further comprise means for recycling hydrogen containing gas to said quench space.

21. A process for assessing at least one property of a catalyst, comprising:
   introducing a mixture of hydrocarbon feedstock and a gas to plurality of chemical reactors each of which contains a catalyst, each of said chemical reactor having a bypass means for a portion of said mixture;
   each of said bypass means being connected to a test reactor which contains a catalyst, wherein a number of the plurality of chemical reactors and test reactors are is equal
   separating said mixture of hydrocarbon feedstock and the gas into a gas phase and a liquid phase in a separation chamber arranged upstream of at least one of said test reactors;
   circulating at least one of the gas phase and the liquid phase in at least one of said test reactors to react said at least one of the gas phase and the liquid phase with said catalyst to produce an effluent from said test reactor, and
   testing said effluent to determine a property of said catalyst in said mixture.

* * * * *